US008586366B2

(12) United States Patent
Hiroki et al.

(10) Patent No.: US 8,586,366 B2
(45) Date of Patent: Nov. 19, 2013

(54) GEL FOR RADIATION DOSIMETER AND RADIATION DOSIMETER WHICH USES THE SAME

(75) Inventors: Akihiro Hiroki, Takasaki (JP); Naotsugu Nagasawa, Takasaki (JP); Masao Tamada, Takasaki (JP); Takuji Kojima, Takasaki (JP); Yuichi Sato, Higashi-ibaraki (JP); Akio Ohta, Higashi-ibaraki (JP); Hisamichi Yamabayashi, Higashi-ibaraki (JP); Takayoshi Yamamoto, Higashi-ibaraki (JP)

(73) Assignee: Japan Atomic Energy Agency, Ibaraki (JP)

( * ) Notice: Subject to any disclaimer, the term of this patent is extended or adjusted under 35 U.S.C. 154(b) by 231 days.

(21) Appl. No.: 13/160,645

(22) Filed: Jun. 15, 2011

(65) Prior Publication Data
US 2011/0312097 A1 Dec. 22, 2011

(30) Foreign Application Priority Data

Jun. 17, 2010 (JP) ................................. 2010-137991

(51) Int. Cl.
*G01N 23/00* (2006.01)
(52) U.S. Cl.
USPC ............... 436/58; 436/57; 430/909; 430/910; 521/50.5; 522/1
(58) Field of Classification Search
None
See application file for complete search history.

(56) References Cited

U.S. PATENT DOCUMENTS 5,321,357 A 6/1994 Maryanski et al.

FOREIGN PATENT DOCUMENTS

JP 2002-214354 7/2002

OTHER PUBLICATIONS

A. Jirasek, Experimental Investigations of Polymer gel Dosimeters, Journal of Physics, Con. Series 56, 4th International Conference on Radiotherapy Gel Dosimetry, 2006, pp. 23-34.
Kim McAuley, Fundamentals of Polymer Gel Dosimeters, Journal of Physics, Con. Series 56, 4th International Conference on Radiotherapy Gel Dosimetry, 2006, pp. 35-44.
Panagiotis Sandilos et al., Mechanical and Dose Delivery Accuracy Evaluation in Radiosurgery Using Polymer Gels, Journal of Applied Clinical Medical Physics, vol. 7, No. 4, Fall 2006, pp. 13-21.
R.J. Senden et al., Polymer Gel Dosimeters with Reduced Toxicity: A Preliminary Investigation of the NMR and Optical Dose-Response Using Different Monomers, Physics in Medicine and Biology, 51, 2006, pp. 3301-3314.

*Primary Examiner* — Robert Xu
(74) *Attorney, Agent, or Firm* — Antonelli, Terry, Stout & Kraus, LLP.

(57) ABSTRACT

Gel for radiation dosimeter including a gel part (A) and a gel part (B) that become cloudy when exposed to a fixed dose or more, wherein said gel part (A) exposed to more than a specified dose above the fixed dose maintains a cloudy state regardless of the decrease in external temperature; and said gel part (B) exposed to less than the specified dose above the fixed dose changes gradually from a cloudy state into a transparent state according to the decrease in external temperature.

7 Claims, 2 Drawing Sheets

ROOM TEMPERATURE 10 °C

ROOM TEMPERATURE          10 °C

GEL FOR RADIATION DOSIMETER AND RADIATION DOSIMETER WHICH USES THE SAME

BACKGROUND OF INVENTION

The present invention relates to gel for a radiation dosimeter useful for measuring accurately the spatial dose distribution at the position of a human body or an animal body irradiated before performing the radiation therapy and a radiation dosimeter which uses the same.

In the radiation therapy, the effective dose with the target regions of cancer is required. And, the minimum dose which does not cause the radiation injury to a normal tissue in the surroundings of the focus is required. Therefore, a variety of radiation therapy methods have been developed. Especially, stereotactic radiotherapy or intensity modulated radiation therapy using a gamma knife or a cyber knife is becoming increasingly popular. Recently, the radiation therapy technology by proton beam irradiation or heavy particle beam irradiation has been used in clinical practice.

In general, when the radiation therapy is performed, the site and the shape etc. of cancer areas are specified by using X-ray computed tomography (X-ray CT) scanner, magnetic resonance imaging (MRI), etc. beforehand. And, the radiation therapy planning such as dose, an irradiation method, etc. is conducted on the basis of the obtained information. Though three-dimensional dose distribution is calculated by using a radiation therapy plan device, and forecasted, the conventional ionization chamber dosimeter or solid state dosimeter, etc. cannot obtain excluding the dose distribution in a point or plane (two-dimension). That is, it is difficult to actually measure a continuous spatial dose distribution (three-dimension) so far. Being paid attention as a dosimeter to measure this spatial dose distribution is a gel dosimeter. Therefore, the gel dosimeter aimed at the establishment of a highly accurate dose evaluation system is actively researched and developed in recent years (Patent Literatures 1 and 2, and Non-Patent Literatures 1 to 3).

Fricke gel dosimeter or a polymer gel dosimeter is reported as a gel dosimeter by which the three-dimensional dose distribution can be measured. Fricke gel dosimeter is composed of the gel which contains the solution of Fricke dosimeter known as a liquid chemical dosimeter (the solution which contains ferrous sulfate). This dosimeter uses the principle that the oxidation reaction (color) of iron from bivalent to trivalent metal according to the irradiation increases in proportion to the absorbed dose. Though the chemical composition adjustment etc. is devised to raise the chemical yield G-value of ferrous ion (trivalent), there is a problem that ferrous ion (trivalent) in the gel diffuses over time, and thus the dose distribution is instable with time. While, in the polymer gel dosimeter, monomer is distributed in the gel, and because polymer is generated in proportion to dose, the dose can be estimated from an amount of the polymer generated (degree of cloudiness). The polymer gel dosimeter has excellent features that it is difficult for the generated polymer to diffuse in the gel, and the cloudy part is stable with time and seems to be the floatage in the transparent gel.

Higher-sensitivity gel dosimeter by which the irradiation position and accuracy can be accurately evaluated has been requested to manage appropriately the quality of the radiation therapy which has been complicated. Therefore, the kind of monomer, the chemical composition adjustment, and the addition of the scavenger for dissolved oxygen, free radicals, etc. are studied in various ways so as to get cloudy even in lower dose (Non-Patent Literatures 1 and 2).

Polymer of N-isopropyl acrylamide (NIPA) is known as the compound which exhibits phase transition behavior (cloudy-transparent state) in response to external temperature change, used in the present invention like a compound described later. And, there is a report that this NIPA is used as monomer for a gel dosimeter (Non-Patent Literature 4). However, the monomer described in Non-Patent Literature 4 is used only as one of monomers to provide a low toxic effect. Therefore, this reference does not provide means for solving the above-mentioned problem of the present invention.

[Patent Literature 1] JP 2002-214354A
[Patent Literature 2] U.S. Pat. No. 5,321,357
[Non-Patent Literature 1] Journal of Physics: Conference Series, 56, 23-34 (2006).
[Non-Patent Literature 2] Journal of Physics: Conference Series, 56, 35-44 (2006).
[Non-Patent Literature 3] Journal of Applied Clinical Medical Physics, 7, 13-21 (2006).
[Non-Patent Literature 4] Physics in Medicine and Biology, 51, 3301-3314 (2006)

SUMMARY OF INVENTION

As a result of the exploration of high-sensitivity gel dosimeter, three-dimensional dose distribution from a low dose region to a high dose region has come to be able to be obtained accurately. However, there is a problem on the difficulties in visual recognition of the shape of the target region, because the target region (part A which corresponds to the cancer organization) not only becomes cloudy but also the surrounding region (part B which corresponds to the normal organization) becomes slightly cloudy As mentioned above, though three-dimensional dose distribution has come to be able to be measured in the polymer gel dosimeter, the problem on the deterioration of visibility is not solved yet. An object of the present invention is to provide gel for radiation dosimeter excellent in visibility, which can measure the three-dimensional dose distribution with high-sensitivity.

The above-mentioned object is achieved by adopting the composition in that the target region maintains the cloudy state despite changes in external temperatures, but only the surrounding region repeats the transparent and cloudy states in response to external temperature change.

As a result of various examination, the inventors had found it was possible to make the gel having the center region (target region) of the irradiation position where the gel becomes cloudy by irradiation, and the surrounding region where the gel becomes cloudy by irradiation, but it is possible to repeat the transparent and cloudy states according to changes of external temperatures by mixing sufficiently solution (1) which contains more than two kinds of monomers which can be polymerized by irradiation, and solution (2) which contains gelling agent which can form gels of high water content.

Gel for a radiation dosimeter according to one aspect of the present invention includes a gel part (A) and a gel part (B), each of which becomes cloudy when exposed to a fixed dose or more. wherein, said gel part (A) exposed to more than a specified dose above the fixed dose maintains the cloudy state regardless of the decrease in external temperature; and said gel part (B) exposed to less than the specified dose above the fixed dose changes gradually from the cloudy state into the transparent state according to the decrease in external temperature. The range from 0 to 50° C. is practicably desirable as the range of change in external temperature. An external temperature can be easily lowered by putting the entire container where the gel was filled in refrigerators during the fixed period of time, for instance.

A radiation dosimeter according to another aspect of the present invention can be most easily made by filling the above-mentioned gel to a transparent container where the radiation can be penetrated. For instance, a part of phantom of a human body can be easily composed by filling the above-mentioned gel to a rectangular parallelepiped and transparent container.

EFFECTS OF INVENTION

The gel for a radiation dosimeter according to the present invention can measure a three-dimensional dose distribution with high sensitivity, and also plainly present the target region by a remarkable temperature response function. Therefore, the present invention is very useful for obtaining informed consent on treatment plans. The doctor can explain the radiation therapy plan easily to a patient by using this gel. On the other hand, a patient can get a sense of security on radiation therapy, because a plain radiation range is presented to the patient by the doctor, and the patient can image the radiation therapy. In addition, because the gel for a radiation dosimeter of polymer gel according to the present invention is the high water content gel in which the polysaccharide etc. are used as a gelling agent, and the size and shape of the gel can be adjusted arbitrarily and handily, this gel can be used also for the tailor-made water equivalent phantom matched to patient's figure (living tissue equivalent phantom).

DETAILED DESCRIPTION OF THE PREFERRED EMBODIMENTS

Figure 1:
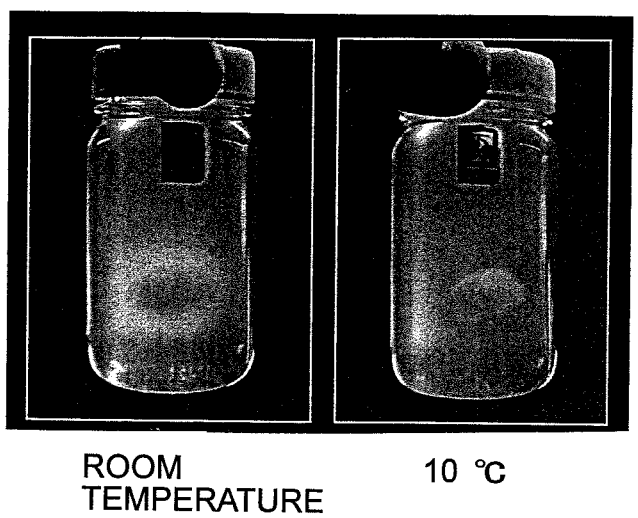
FIG. 1 is a photograph taken after irradiating the gel for a radiation dosimeter made in embodiment 1.

The present invention will be explained with reference to the attached drawings. In the present invention, solution (1) in which more than two kinds of monomers are mixed and solution (2) which contains gelling agent to form gel are prepared first. Next, solutions (1) and (2) are mixed enough, and then the mixed solution is fed to a fixed container. The gel for a radiation dosimeter can be obtained by leaving at rest and keeping the container. The gel obtained thus can measure a three-dimensional dose distribution with high sensitivity, and exhibit the characteristic (temperature response) that the surrounding region of the target region repeats the transparent and cloudy states in response to external temperature change. In addition, the phase transition temperature (temperature when the change of the state occurs) and the radiation sensitivity (degree of cloudiness corresponding to dose) can be controlled by making fine adjustment in the kind of the monomers and the composition ratio, etc. of solution (1).

It should be appreciated that the monomer to obtain the gel for a radiation dosimeter according to the present invention may have the carbon-carbon unsaturated bond which can be polymerized by the action of radiation. Especially, copolymer obtained from the polymerization of more than two kinds of monomers should show the temperature response, but not be limited. Because the balance of hydrophilic property and hydrophobic property in the polymers is important to allow the expression of the temperature response function, the combination and the composition ratio of the monomers used in the present invention must be considered carefully.

Monomers which can be used include, methyl methacrylate, ethyl methacrylate, 2-methoxymethyl methacrylate, 2-ethoxyethyl methacrylate, 2-hydroxyethyl methacrylate, triethylene glycol monoethyl ether methacrylate, methyl acrylate, ethyl acrylate, butyl acrylate, 2-methoxyethyl acrylate, N-vinylpyrrolidone, acrylamide, acryloyl morpholine, N-isopropyl acrylamide, methacryloyl L-alanine methyl ester, acryloyl L-proline methyl ester, and the like.

Moreover, it is desirable that at least one kind of monomer which has two unsaturation uniting or more in one molecule is included for polymer generated after irradiation not to diffuse and move in the gel. Such multifunctional monomers include, methylene bisacrylamide, polyethylene glycol di(meth)acrylate and the like. The number of units of ethylene glycols is 1, 2, 3, 4, 9, 14, and 23. Especially, the water soluble ethylene glycol whose number of units is 9 or more is desirable from the viewpoint of solubility. The monomer may be uniformly distributed in the gel, and the entire gel before irradiation may be transparent though among the above-mentioned monomers, there is the one not dissolved easily to water. In addition, 5 wt % or less of the organic solvent such as alcohol, etc. may be added to improve the homogeneous dispersion.

Gelling agent to obtain the gel for a radiation dosimeter according to the present invention includes, but not limited to, Natural polymers such as agarose, carrageenan, gellan gum, xanthan gum and gelatins. As for the molecular weight of the natural polymer, about 1,000-1,000,000 is desirable when thinking about the easiness of preparation of solution (2), the stability of the gel formed, etc. Now, there are covalent bond, Coulomb force uniting, hydrogen bond, coordinate bond, and physical entanglement, etc. as uniting. The uniting to form the gel may include any of the above-mentioned uniting, but may be the uniting which is stable against the temperature change after the radiation is irradiated to the gel.

It is preferable to add oxygen scavengers such as ascorbic acid, tetrakis (hydroxymethyl) phosphonium chloride (THPC) to the solution (1) to promote the radiation-induced polymerization reaction and to improve the radiation sensitivity in the present invention. In addition, it is desirable to add the pH adjuster such as glucono-δ-lactone by which pH in mixed solution of (1) and (2) is gradually changed from neutral to acidic to form a homogeneous gel according to the kind of natural polymer used as gelling agent.

Coloring agents, free radical scavengers such as hydroquinone, or ultraviolet absorbents such as guaiazulene may be used if necessary when the present invention is executed.

A radiation dosimeter, for instance, a phantom can be made by filling the gel of the present invention to a suitable container. The container has to be a thing not to be detected by MRI, to transmit the radiation, and to have resistance to solvent attack and to be airtight. Glass, acrylic resin, polyester, and ethylene vinyl alcohol copolymer, etc. are desirable as material of the container, but not limited to them. If the container is transparent, three-dimensional dose distribution can be measured by not only MRI but also using optical CT which can perform the three-dimension measurement of clouded region. Moreover, after filling the gel to the container, it is possible to substitute atmosphere with nitrogen gas, etc.

EMBODIMENTS

Hereinafter, the present invention will be explained more in detail by using some embodiments. In the embodiments, polysaccharide of food additive is used as gelling agent, and the gel is prepared by using deacylated gellan gum (Ina Food Industry Co., Ltd.) that the difference between the gelling temperature and the gel melting temperature is large. However, the present invention is not limited to the following embodiments.

Embodiment 1

First, solution (1) was prepared by dissolving 2 g of 2-hydroxyethyl methacrylate (HEMA, Wako Pure Chemical Industries, Ltd.), 2 g of triethylene glycol monoethyl ether monomethacrylate (TGMEMA, Polysciences, Inc.), 2 g of polyethylene glycol dimethacrylate (the number of ethylene glycol is 9, 9G, Shin-Nakamura Chemical Co., Ltd.), 0.114 g of tetrakis (hydroxymethyl) phosphonium chloride (THPC, Wako Pure Chemical Industries, Ltd.), and 0.356 g of glucono-δ-lactone (GL, Wako Pure Chemical Industries, Ltd.) to 43.53 g of deionized water. Moreover, solution (2) was prepared by dissolving 0.4 g of gellan gum to 49.6 g of deionized water at 95° C. Second, after mixing the solution (2) cooled slowly up to 40° C. with the solution (1) enough, the mixed solution was put into a PET bottle of 100 mL and put on a cool and dark place to obtain gel. A spheroidal target dose region (10 mm in diameter) was set in the vicinity of the center of a sample of the obtained gel for a radiation dosimeter, and X rays were irradiated to the target dose region by using radiation therapy device "Cyber knife".

Here, referring to FIG. 1. FIG. 1 shows a photograph of the gel obtained after the radiation is irradiated to the gel for a radiation dosimeter made according to embodiment 1. A left photograph shows the gel kept at room temperature, and a right photograph shows the gel kept at 10° C. It was able to be visually confirmed that at room temperature, the target dose region of 10 Gy or more became cloudy, and the surrounding region (dose region of less than 10 Gy) had whitened slightly. And, the coincidence of the dose distribution which had been assumed and the target dose region was confirmed by MRI measurement. Next, it was able to be visually confirmed that when this irradiation sample was kept at 10° C. for 30 minutes in a refrigerator, the target dose region of 10 Gy or more became cloudy and the surrounding region (dose region of less than 10 Gy) became transparent. The surrounding region whitened slightly again when leaving it at room temperature (25° C.).

Embodiment 2

2.2 g of HEMA, 0.8 g of TGMEMA, 3 g of 9G, 0.114 g of THPC, and 0.356 g of GL were dissolved to 43.53 g of deionized water, and solution (1) was made. Moreover, 0.4 g of gellan gum was dissolved to 49.6 g of deionized water at 95° C., and solution (2) was made. Gel is made by using the same process as embodiment 1, and then irradiated.

It was able to be visually confirmed that at room temperature, the target dose region of 10 Gy or more became cloudy, and the surrounding region (dose region of less than 10 Gy) had whitened slightly. And, the coincidence of the dose distribution which had been assumed and the target dose region was confirmed by MRI measurement. Next, it was able to be visually confirmed that when this irradiation sample was kept at 10° C. for 30 minutes in a refrigerator, the target dose region of 10 Gy or more became cloudy and the surrounding region (dose region of less than 10 Gy) became transparent. The surrounding region whitened slightly again when leaving it at room temperature (25° C.).

Figure 2:
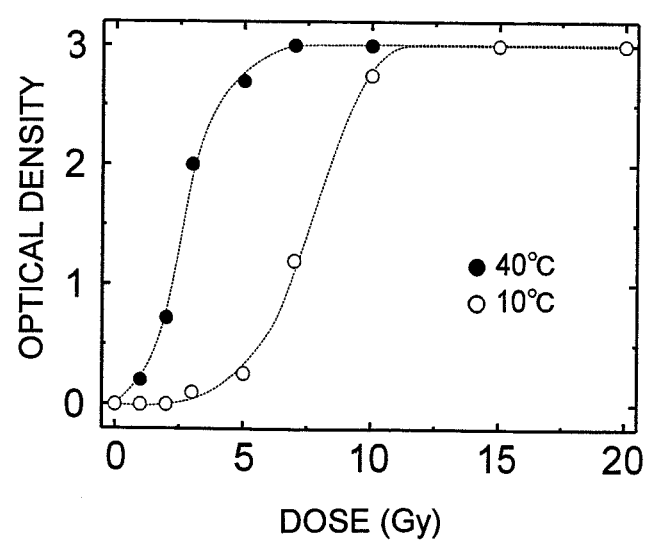
FIG. 2 is a graph to explain the temperature response of the change between a cloudy state and a transparent state of the gel for a radiation dosimeter made in embodiment 2.

Referring to FIG. 2, the temperature response of the change between a cloudy state and a transparent state will be explained based on the above-mentioned embodiment 2. FIG. 2 is a graph showing a plot of the results of the conversion of transmission (wave length 660 nm) of samples at 10° C. and 40° C. into the optical density, wherein gel of the sample is formed by irradiating γray after pouring the solution prepared under the same condition as embodiment 2 into a cell for ultraviolet-visible spectrometry.

After pouring the mixed solution of solutions (1) and (2) prepared under the same conditions as embodiment 2 into the cell for ultraviolet-visible spectrometry having optical path length 1 cm, and gelling, γ ray from a cobalt-60 source was irradiated in a fixed dose. Next, a transmission (wave length 660 nm) of the gel irradiated was measured at 10° C. and 40° C. And, transmission was converted into the optical density, and plotted with respect to the dose. As understood from FIG. 2, the optical density of the gel at 10° C. was 0.1 at 3 Gy, and 0.25 at 5 Gy. It increased according to the increase of the dose, and reached about 3 at 10 Gy. On the other hand, the optical density of the gel at 40° C. began to increase from only 1 Gy, and reached 3 at 7 Gy. Here, the higher the optical density, the more the gel became cloudy. At 10° C., the gel of higher dose than 7 Gy became cloudy, and at 40° C., the gel of higher dose than 2 Gy became cloudy. Therefore, the temperature response gel can be obtained, which the gel of the irradiation dose of 7 Gy or less exhibits transparent state at 10° C., and cloudy state at 40° C. A temperature response gel, which follows the change in external temperature, that is, causes the change in the visibility shown in the photograph of FIG. 1 was able to be formed by adjusting the dose like this.

Embodiment 3

Solution (1) was made by dissolving 2 g of TGMEMA, 0.5 g of 9G, 0.114 g of THPC and 0.356 g of GL to 46.53 g of deionized water. And, solution (2) was made by dissolving 0.4 g of gellan gum to 49.6 g of deionized water at 95° C. X-rays were irradiated after gelation according to the same procedure as embodiment 1.

It was able to be visually confirmed that at the room temperature, the target dose region of 10 Gy or more became cloudy, and the surrounding region (dose region of less than 10 Gy) had whitened slightly. And, the coincidence of the dose distribution which had been assumed and the target dose region was confirmed by MRI measurement. Next, it was able to be visually confirmed that when this irradiation sample was kept at 10° C. for 30 minutes in a refrigerator, the target dose region of 10 Gy or more became cloudy and the surrounding region (dose region of less than 10 Gy) transparent. The surrounding region whitened slightly again when leaving it at room temperature (25° C.).

COMPARATIVE EXAMPLE

Comparative Example 1

Solution (1) was prepared by dissolving 2 g of HEMA, 0.2 g of 9G, 0.114 g of THPC and 0.356 g of GL to 43.53 g of deionized water. And, solution (2) was prepared by dissolving 0.4 g of gellan gum to 49.6 g of deionized water at 95° C. Radiation is irradiated after gelation according to the same procedure as embodiment 1.

Figure 3:
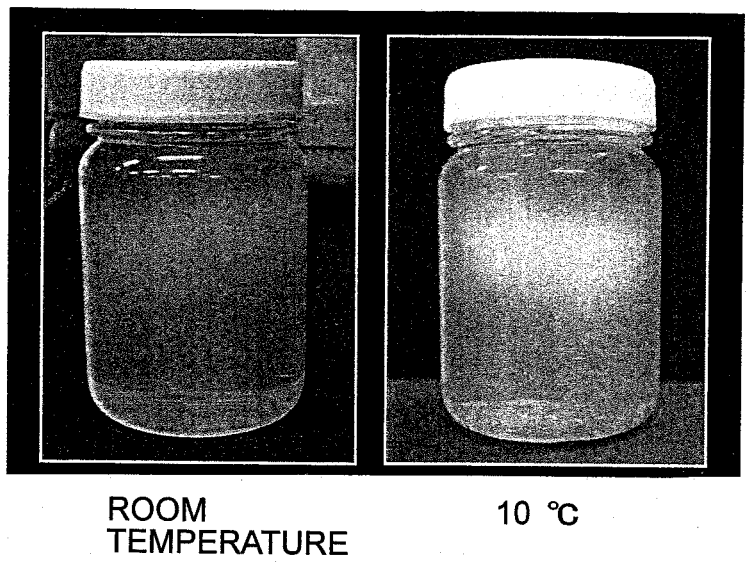
FIG. 3 is a photograph taken after irradiating the gel for a radiation dosimeter made in comparative example 1.

A photograph taken after irradiating the gel for a radiation dosimeter made in comparative example 1 is shown in FIG. 3. At 10° C.-40° C., slight cloudy state is maintained without visible change. It was able to be visually confirmed that at room temperature, the target dose region of 10 Gy or more became cloudy, and the surrounding region (dose region of less than 10 Gy) had whitened slightly. And, the coincidence of the dose distribution which had been assumed and the target dose region was confirmed by MRI measurement. The surrounding region remained becoming cloudy slightly even after this irradiation sample was kept at 10° C. for 30 minutes in a refrigerator and rose the temperature up to 40° C. as understood from a right photograph of FIG. 3. Although the photograph at 10° C. is slightly cloudy under the influence of the background of the photograph compared with the state of the room temperature, it was almost the same as the state of the room temperature in fact.

The gel according to the present invention can be obtained by controlling the kind of the selected monomers and the composition ratio as clearly seen from embodiment 1 to 3 and comparative example 1. Therefore, the gel for a radiation dosimeter according to the present invention can measure a three-dimensional dose distribution with high sensitivity, and also plainly present the target region by a temperature response function. The expression of solution (1) and solution (2) used in the above-mentioned explanation is used only for distinguishing the solution which contains gelling agent of solution from the solution in which more than only two kinds of monomers are mixed.

What is claimed is:

1. A gel for a radiation dosimeter including a gel part (A) and a gel part (B) that become cloudy when exposed to a fixed dose or more, the gel part (B) being provided adjacent the gel part (A), wherein, said gel part (A) exposed to more than a specified dose above the fixed dose maintains a cloudy state regardless of the decrease in external temperature; and said gel part (B) exposed to less than the specified dose above the fixed dose changes gradually from a cloudy state into a transparent state according to the decrease in external temperature.

2. The gel according to claim 1, wherein said gel is made from solution (1) which contains more than two kinds of monomers which can be polymerized by irradiation, and solution (2) which contains gelling agent which can form gels of high water content.

3. The gel according to claim 2, wherein said copolymer obtained from polymerization reaction of more than two kinds of said monomers exhibits phase transition behavior under the existence of water in response to external temperature change within the range of 0.degree. C. to 50.degree. C.

4. The gel according to claim 2, wherein said solution (1) which contains said monomers is solution which contains more than two kinds of compounds which have one or more carbon-carbon unsaturated bond, and which is dissolved in solvent.

5. The gel according to claim 2, wherein said solution (2) which contains gelling agent is solution in which more than one-kind or two kinds of natural organic polymers are dissolved in solvent at a concentration which can form gel.

6. The gel according to claim 1, wherein either oxygen scavenger or pH adjuster is added to said gel.

7. The gel according to claim 1, wherein the gel part (A) is provided at a central region of the gel and the gel part (B) is provided at an adjacent region surrounding the central region.

* * * * *